United States Patent [19]

McClintock

[11] 3,942,167
[45] Mar. 2, 1976

[54] IMMERSION RESPONSIVE SENSOR

[76] Inventor: Richard D. McClintock, Washington Road, Woodbury, Conn. 06798

[22] Filed: Sept. 19, 1973

[21] Appl. No.: 398,776

[52] U.S. Cl. .............................. 340/244 C; 340/332
[51] Int. Cl.$^2$ .......................................... G08B 21/00
[58] Field of Search .................................. 340/244 C

[56] References Cited
UNITED STATES PATENTS

| | | | |
|---|---|---|---|
| 2,452,615 | 11/1948 | Thomson | 340/244 C |
| 2,792,566 | 5/1957 | Shanhouse | 340/244 C |
| 2,999,230 | 9/1961 | Laakmann | 340/244 C |
| 3,311,983 | 4/1967 | Green | 340/244 C |

*Primary Examiner*—Thomas B. Habecker
*Attorney, Agent, or Firm*—Hubbell, Cohen & Stiefel

[57] ABSTRACT

Apparatus responsive to immersion in water to complete an electrical circuit through which a signalling means is energized from an electrical energy source includes a sensor which is salt or fresh water actuated depending on the sensitivity of the circuitry utilized in conjunction with the sensor. The sensor comprises an outer peripheral shield, such as an outer conductor, and an inner conductor, or pair of inner conductors, wherein air holes or slots are provided in the outer shield so as to enable the venting of air from within the interior of the outer shield at substantially any depth of immersion of the sensor in water less than total immersion while preventing the inadvertent entry of splash water prior to such immersion. In this manner water may enter within the outer shield interior to contact the conductor elements and complete the electrical circuit at immersion depths where the water pressure is normally insufficient to cause such entry without venting of the air.

8 Claims, 12 Drawing Figures

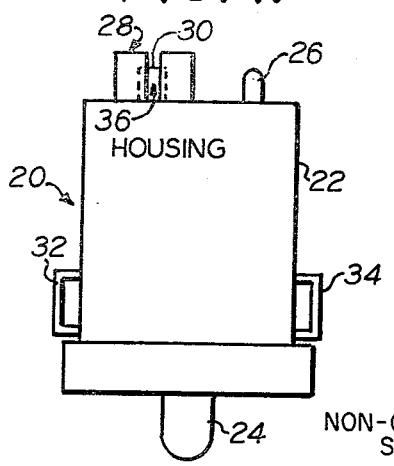
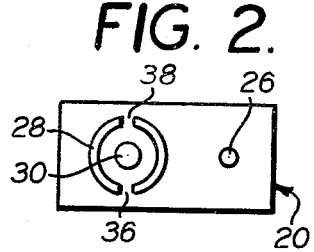
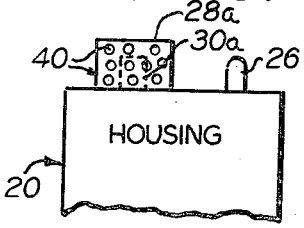
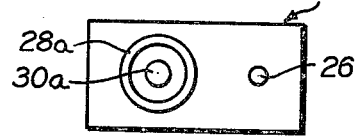
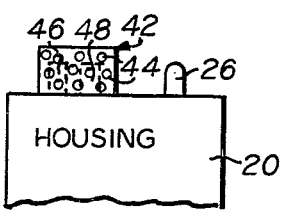
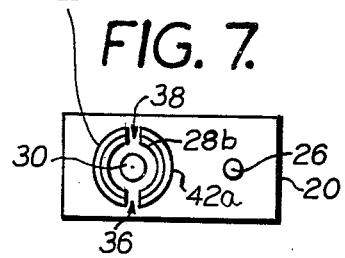
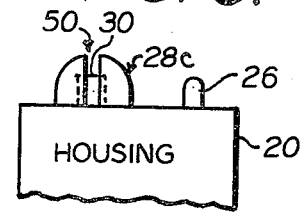
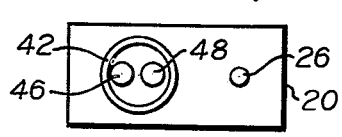
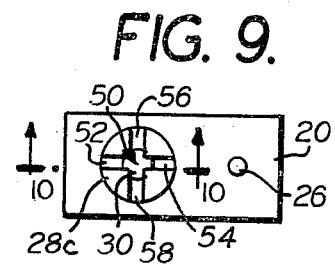
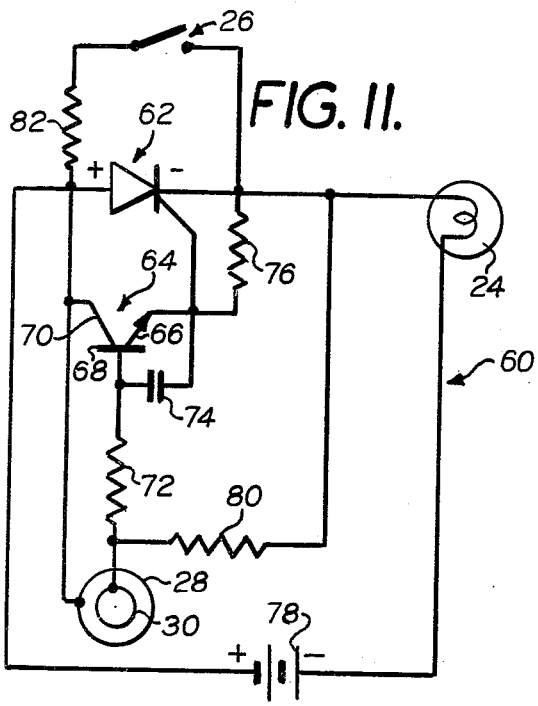
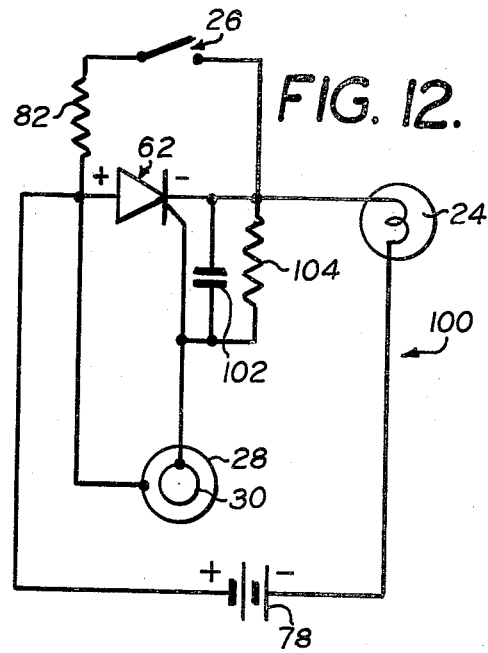

IMMERSION RESPONSIVE SENSOR

BACKGROUND OF THE INVENTION

1. Field of the Invention

The present invention relates to apparatus responsive to immersion in water to complete an electrical circuit through which a signalling means is energized from an electrical energy source.

2. Description of the Prior Art

Immersion responsive sensors, such as the type which are responsive to immersion in water to complete an electrical circuit through which a signalling means is energized from an electrical energy source, such as a battery, are well known such as disclosed in U.S. Pat. Nos. 3,602,661; 3,686,656 and 1,327,262. Such immersion responsive sensors are normally of two types. One such type is where a pair of conductors are located in a depression in the housing for the device which conductors protrude a sufficient amount so that inadvertent contact by the flesh of the user would complete the electrical path and inadvertently activate the signalling device. Another type of such sensor involves the use of a surrounding pocket in which the conductors were recessed. However, in such an instance, if the device were perpendicularly dropped into the water, the water pressure at minimal immersion depths, such as 10 feet by way of example, would normally be insufficient to overcome the pressure of the entrapped air within the pocket and the water would be prevented from entering the pocket and contacting the conductors. Thus, the electrical circuit path would not be instantaneously completed upon immersion in water until after what could possibly be a critical interval had past. Furthermore, prior art immersion responsive sensors normally have a relatively low sensitivity so that the electronic circuit must have a correspondingly high sensitivity which makes the electronic circuit sensitive to atmospheric conditions such as static electricity, radio frequency interference, electromagnetic interference, dew etc. These disadvantages of the prior art are overcome by the present invention.

SUMMARY OF THE INVENTION

Apparatus responsive to immersion in water to complete an electrical circuit through which a signalling means is energized from an electrical energy source is provided. The immersion responsive apparatus comprises a housing for the signalling means, such as a lamp for providing a visual signal when the circuit is completed, a first inner electrically conductive element protruding from the housing and a second outer element protruding from the housing and substantially peripherally surrounding the first inner element to form a circumferential shield therefor. The shield has an opening in an end thereof opposite from the housing for enabling water to enter therethrough upon immersion. The first and second elements are co-extensive, with the first element extent being less than the second element extent by a sufficient amount to prevent inadvertent electrically conductive contact with the first element prior to such immersion. The outer circumferential shield element has an air passageway, such as longitudinally extending slots or dispersed apertures, in the peripherally surrounding portion with the air passageway being located in the peripherally surrounding portion for enabling the venting of air from within the interior of the outer shield element at substantially any depth of immersion of these elements in water less than total immersion while preventing the inadvertent entry of splash water prior to such immersion. In this manner, water, such as salt water or fresh water depending on the sensitivity of the elctronics associated with the sensor, may enter within the outer shield element interior to contact the first element and complete the electrical circuit at immersion depths where the water pressure is normally insufficient to cause the entry without venting of the air. The outer shield may substantially enclose the inner conductor except for the air passageway and opening in the opposite end of the shield having a diameter substantially equivalent to the diameter of the inner conductive element. The air passageways may comprise at least two opposed pairs of longitudinal slots spaced about the outer shield peripheral portion and communicating with such an opening. In addition, the outer shield element may comprise an electrically conductive element, such as a ground element for the circuit, with the water completing the circuit between the electrically conductive elements in response to such immersion. Furthermore, the outer shield element may comprise an outermost non-conductive element, such as a thermoplastic, surrounding an outer shield conductive element, such as the previously mentioned ground element, with the air passageway extending through these elements which comprise the outer shield element. If desired, the sensor may comprise a pair of conductive elements within a peripherally surrounding non-conductive outer shield of the type previously mentioned with the water completing the circuit between the electrically conductive elements in response to such immersion.

BRIEF DESCRIPTION OF DRAWING

FIG. 1 is a front elevation diagrammatic view of a signalling apparatus utilizing the preferred immersion responsive sensor in accordance with the present invention, with the apparatus being illustrated in the inverted position;

FIG. 2 is a top plan view of the embodiment shown in FIG. 1;

FIG. 3 is a fragmentary diagrammatic illustration of an alternative embodiment of the immersion responsive sensor illustrated in FIG. 1;

FIG. 4 is a top plan view of the alternative embodiment illustrated in FIG. 3;

FIG. 5 is a fragmentary diagrammatic illustration of another alternative embodiment of the immersion responsive sensor illustrated in FIG. 1;

FIG. 6 is a top plan view of the embodiment illustrated in FIG. 5;

FIG. 7 is a top plan view, similar to FIG. 2, of still another alternative embodiment of the immersion sensor illustrated in FIG. 1;

FIG. 8 is a fragmentary diagrammatic view, similar to FIG. 1, of still another alternative embodiment of the immersion responsive sensor illustrated in FIG. 1;

FIG. 9 is a top plan view of the immersion responsive sensor illustrated in FIG. 8;

FIG. 10 is a fragmentary sectional view taken along line 10—10 of FIG. 9;

FIG. 11 is a schematic diagram of a fresh water immersion responsive sensing apparatus in accordance with the present invention; and FIG. 12 is a schematic diagram of a salt water immersion responsive sensing apparatus in accordance with the present invention.

DETAILED DESCRIPTION OF THE PREFERRED EMBODIMENT

Referring now to the drawings in detail and initially to FIGS. 1 and 2 thereof, a typical signalling apparatus, or immersion responsive apparatus, generally referred to by reference numeral 20 is shown. This apparatus 20, which for illustrative purposes will be described as a signalling lamp for providing a visual signal upon immersion of the apparatus 20 in water, such as salt water or fresh water, preferably comprises a housing 22, which preferably contains the electronic circuitry, such as illustrated in FIG. 11 or 12 depending on whether it is a fresh water or salt water responsive apparatus, respectively, a signalling lamp 24 which is turned on in response to the completing of an electrical path to be described in greater detail hereinafter, a switch 26 overriding the operation of the device to turn it off and/or on manually, and a pair of electrically conductive sensing elements which, in the example shown in FIG. 1, preferably comprise an outer electrically conductive element 28 and an inner electrically conductively element 30 which is surrounded by the outer conductive element 28. In addition, as illustrated in FIG. 1, by way of example, if desired the assembly may comprise mounting means such as loops 32 and 34 on the outside thereof for enabling the threading of a strap therethrough for mounting the apparatus 20 on the user thereof. For purposes of illustration, the apparatus 20 is shown upside down in FIG. 1, the preferred normal manner of use being with the sensing elements 28 and 30 facing in a direction normally closest to the water and the signalling lamp 24 facing in a direction away from the water. As illustrated in FIG. 2, the sensing elements 28 and 30 are preferably arranged so as to both protrude from housing 20 with inner conductive element 20 protruding by a smaller longitudinal distance than outer conductive element 28, the length of inner conductive element 30 being less than the length of outer conductive element 28 by a sufficient amount to prevent inadvertent electrically conductive contact with the inner conductive element 30 prior to immersion of the apparatus 20 in water. In addition, as shown and preferred in FIGS. 1 and 2, the outer conductive element or shield for the inner conductor 30, preferably includes a pair of longitudinally extending slots 36 and 38 which preferably extend the full length of the outer conductive shield 28. These slots enable the venting of air from within the interior of the outer shield element 28 at substantially any depth of immersion of the sensing elements 28 and 30 in water less than total immersion while preventing the inadvertent entry of splash water prior to such immersion. In this manner, water may enter within the outer shield element 28 interior to contact the inner conductive element 30 and complete an electrical circuit path between the signalling lamp 24 and the energy source therefor at immersion depths where the water pressure is normally insufficient to cause such entry without venting of the air.

Referring now to FIGS. 3 and 4, an alternative embodiment of the sensing element arrangement 28-30 of FIGS. 1 and 2 is shown. Specifically, instead of providing longitudinal slots 36 and 38 in outer conductive shield 28a of FIG. 3, a plurality of apertures 40 are dispersed about the circumferentially surrounding peripheral portion of outer conductive shield 28a at a plurality of longitudinal levels so as to enable the venting of air from within the interior of the outer shield 28a at substantially any depth of immersion of elements 28a-30a in water less than total immersion while preventing the inadvertent entry of splash water prior to such immersion, these apertures 40 functioning in the same fashion as longitudinal slots 36 and 38 of the embodiment previously described with reference to FIG. 1.

Referring now to FIGS. 5 and 6, still another alternative embodiment of the sensing element 28-30 arrangement previously described with reference to FIG. 1 is shown. In this arrangement, the outer shield is preferably formed of a non-conductive material such as a thermoplastic as opposed to being formed of a conductive material as in the previously described embodiments. This outer non-conductive shield 42 preferably includes a plurality of apertures 44 similar in location and purpose to apertures 40 previously described with reference to the embodiment of FIGS. 3 and 4. As shown and preferred in FIG. 5 and 6, a pair of inner conductive elements 46 and 48 are preferably located within the interior of the outer shield 42. These inner conductive elements 46 and 48 preferably have a length or longitudinal extent which is less than that of the outer non-conductive shield 42 by a sufficient amount to prevent inadvertent electrically conductive contact with the inner conductive elements 46 and 48 prior to immersion in water. It should be noted in the embodiments illustrated in FIGS. 1 through 6, the outer shield 28, 28a or 42 is preferably open at the top thereof to enable entry of water therethrough. Furthermore, although not shown, if desired, outer non-conductive shield 42 may be slotted in a fashion similar to that previously described with reference to outer conductive element 28 of FIG. 1 as opposed to utilizing the disposed apertures 44.

Referring now to FIG. 7, another alternative embodiment of the arrangement illustrated in FIG. 1 is shown. Specifically, the outer shield may comprise two elements, with or without an air space provided between these two elements. These two elements preferably are an outermost non-conductive shield 42a, such as a thermoplastic, and an inner peripheral or annular conductive element 28b similar to outer element 28 previously described with reference to FIG. 1. Within the interior of the outer shield formed by elements 42a and 28b, a inner conductive element 30, such as the type previously described with reference to FIG. 1, is preferably located and has a longitudinal extent which is less than the longitudinal extent of elements 42a and 28b by a sufficient amount so as to prevent inadvertent electrically conductive contact therewith prior to immersion in water. If desired, the outer shield of FIG. 7 could have the conductive element and the non-conductive element reversed with the conductive element being on the outside and the non-conductive element being on the inside.

Referring now to FIGS. 8, 9 and 10, still another alternative embodiment of the arrangement previously described with reference to FIG. 1 is shown. Specifically, the outer shield preferably comprises a conductor element 28c whose configuration is such so as to substantially enclose the inner conductive element 30 from the top thereof as well as circumferentially with the top of outer conductor element 28c preferably having an opening therein having a diameter substantially equivalent to the diameter of the inner conductive element 30 or, if desired, the diameter of this opening 50 may be slightly less than or slightly greater than the diameter of the inner conductor 30. As shown and preferred in FIGS. 8, 9 and 10, outer conductive element 28c preferably contains two pairs of opposed longitudinally extending slots 52–54 and 56–58 which are similar in function to longitudinal slots 36 and 38 previously described with reference to FIGS. 1 and 2, with slots 52, 54, 56 and 58 communicating with opening 50 so as to enable the venting of air from within the interior of the outer conductive element 28c at substantially any depth of immersion of the conductive elements 28c–30 in water less than total immersion while preventing the inadvertent entry of splash water prior to such immersion. If desired, although not shown, any combination of non-conductive and conductive elements may be utilized to form the sensing elements. For example, outer conductive element 28c could be surrounded by a non-conductive outer most shield, or any other permutation and combination of non-conductive and conductive elements could be utilized provided that the outer shield element has an air passageway therein which enables the venting of air from within the interior of the outer shield element at substantially any depth of immersion of the sensing elements in water less than total immersion while preventing the inadvertent entry of splash water prior to such immersion.

Referring now to FIG. 11 a typical schematic diagram of a fresh water sensing circuit, generally referred to by the reference numeral 60, for use in accordance with the present invention is shown. Specifically, the sensing circuit 60 preferably comprises an SCR 62, and a transistor amplifier 64 with conventional associated biasing networks. The transistor 64 preferably includes an emitter 66, a base 68 and a collector 70 with the base 68 being connected to the inner electrode 32 and an R-C network composed of a resistor 72 and a capacitor 74. The capacitor 74 is connected in a feed back path from base 68 to emitter 66. The collector 70 of the transistor amplifier 64 is connected to the outer conductive element 28 and, in parallel, to the anode of the SCR 62 whose gate electrode is connected to the emitter 66. A conventional gate bias resistor 76 is provided for the SCR 62 and manual switch 26 is connected across this SCR 62. The signalling lamp 24 is electrically connected in series with battery source 28 and the SCR 62 and switch 26, with switch 26 being connected in parallel with the SCR 62. A resistor 80 is connected in parallel between inner conductive element 30 and the cathode of the SCR 62 and functions as a desensitizing resistor to decrease the sensitivity of the sensing elements 28 and 30 to environmental conditions. The operation of the circuit of FIG. 11 is as follows. When the responsive apparatus 20 is immersed in water, current flows between elements 28 and 30. This current raises the potential of element 30 due to resistive element 80 and causes transistor amplifier 64 to conduct after overcomming the time lag provided by the RC network 72-74. The conduction of transistor 64 raises the level of the gate of the SCR 62, thus turning SCR 62 on and latching it in the on state. This completes the circuit path between the signalling lamp 24 and the battery source 78 therefore turning lamp 24 on. When the apparatus 20 is removed from water and it is desired to then turn the lamp 24 off, switch 26 is closed. The resultant drop across switch 26 and resistor 82 connected in series therewith is of a sufficiently low level so that the SCR 62 can no longer maintain its conduction and, thus turns off. Switch 26 can then be opened and the lamp will then be placed in the off state.

Referring now to FIG. 12, a typical fresh water immersion sensing circuit 100 is shown. Identical elements in this circuit 100 with those previously described with reference to fresh water sensing circuit 60, for purposes of explanation, have identical reference numerals. The gate of SCR 62 in circuit 100 is preferably connected to inner conductive element 30 while the anode of SCR 62 is preferably connected to outer conductive element 28. A bypass capacitor 102 is provided directly between the gate and cathode of the SCR 62 and a resistor 104 is connected between the gate and cathode of SCR 62. Resistor 104 provides both bias for the gate of the SCR 62 and the loading or desensitizing of the sensing elements 28 and 30. Operation of this circuit is as follows. When the sensing elements 28 and 30 are immersed in water, current flows from element 28 to element 30 and through resistor 104 thus raising the potential of the gate of the SCR 62 until the SCR 62 conducts. When the device 20 is removed from the salt water and it is desired to turn the lamp 24 off, switch 26 is closed and then reopened with the operation of the circuit being similar to that previously described with reference to circuit 60 of FIG. 11. It should be noted that capacitor 102 of circuit 100 and capacitor 74 of circuit 60 provide transient supression to desensitize the sensing circuit 60 and 100 to environmental conditions.

It is to be understood that the above described embodiments of the invention are merely illustrative of the principles thereof and numerous modifications and embodiments of the invention may be derived within the spirit and scope thereof.

What is claimed is:

1. Apparatus responsive to immersion in water in an open environment to complete an electrical circuit through which a signalling means is energized from an electrical energy source, said immersion responsive apparatus comprising latchable means responsive to completion of said circuit for latching said signalling means in an energized condition, a housing for said signalling means, a first inner electrically conductive element protruding from said housing and a second outer element protruding from said housing and substantially peripherally surrounding said first inner element to form a circumferential electrical shield for said first inner element to prevent said latchable means from latching in response to interference transients, said electrical shield having an opening at an end thereof opposite from said housing for enabling water to enter therethrough upon immersion, said outer electrical shield comprising an electrically conductive element which comprises a ground element for said circuit and an outermost non-conductive element surrounding said outer shield conductive element, said water completing said circuit between said electrically conductive elements in response to said immersion, said first and second elements being coextensive with said first element extent being less than said second element extent by a sufficient amount to prevent inadvertent electrically conductive contact with said first element prior to said immersion, said outer circumferential electrical shield having an air passageway in said peripherally surrounding portion for enabling the venting of air from within the interior of said outer electrical shield element at substantially any depth of immersion of said first and second elements in water less than total immersion while preventing the inadvertent entry of splash water prior to said immersion, said air passageway extending substantially the full longitudinal extent of said outer electrical shield and extending through said elements comprising said outer shield element, whereby water may enter within said outer electrical shield element interior to contact said first element and complete said electrical circuit at immersion depths where the water pressure is normally insufficient to cause said entry without venting of air and false signalling due to interference transients is prevented.

2. An apparatus in accordance with claim 1 wherein said air passageway comprises at least one longitudinal slot extending at least substantially the full longitudinal extent of said outer electrical shield.

3. An apparatus in accordance with claim 1 wherein said air passageway comprises at least a pair of substantially opposed longitudinal slots extending at least substantially the full longitudinal extent of said outer electrical shield.

4. An apparatus in accordance with claim 1 wherein said air passageway comprises a plurality of apertures dispersed at a plurality of longitudinal levels about said peripherally surrounding portion.

5. An apparatus in accordance with claim 1 wherein said outer electrical shield substantially encloses said inner first element except for said air passageway and said opening in said opposite end, said opening having a diameter substantially equivalent to the diameter of said first inner element.

6. An apparatus in accordance with claim 5 wherein said air passageway comprises at least one substantially longitudinal slot extending substantially the full longitudinal extent of said outer electrical shield to communicate with said opening.

7. An apparatus in accordance with claim 6 wherein said air passageway comprises at least two opposed pairs of said slots spaced about said outer electrical shield peripheral portion.

8. An apparatus in accordance with claim 1 wherein said signalling means comprises a lamp for providing a visual signal when said circuit is completed.

* * * * *